(12) United States Patent
Van Der Zwan

(10) Patent No.: US 11,509,881 B2
(45) Date of Patent: Nov. 22, 2022

(54) STEREO CAMERA AND STEREOPHOTOGRAMMETRIC METHOD

(71) Applicant: LEICA GEOSYSTEMS AG, Heerbrugg (CH)

(72) Inventor: Elmar Vincent Van Der Zwan, Altstätten (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 8 days.

(21) Appl. No.: 16/195,659

(22) Filed: Nov. 19, 2018

(65) Prior Publication Data

US 2019/0158811 A1 May 23, 2019

(30) Foreign Application Priority Data

Nov. 20, 2017 (EP) .................................... 17202630

(51) Int. Cl.
*H04N 13/239* (2018.01)
*G01C 11/02* (2006.01)
(Continued)

(52) U.S. Cl.
CPC ........... *H04N 13/239* (2018.05); *B64D 47/08* (2013.01); *G01C 3/14* (2013.01); *G01C 11/02* (2013.01); *G01C 11/16* (2013.01); *G06T 7/593* (2017.01); *G06V 10/751* (2022.01); *H04N 5/23293* (2013.01); *H04N 13/296* (2018.05);
(Continued)

(58) Field of Classification Search
CPC ................................. H04N 13/239; G01C 3/14
See application file for complete search history.

(56) References Cited

U.S. PATENT DOCUMENTS 6,038,074 A * 3/2000 Kitaguchi .............. G01C 11/06
128/916
9,185,387 B2 * 11/2015 Campbell .............. G06T 5/002
(Continued)

FOREIGN PATENT DOCUMENTS

CN 106382917 A 2/2017
DE 10 2013 202658 A1 8/2014
EP 2 918 972 A2 9/2015

OTHER PUBLICATIONS

European Search Report dated May 28, 2018 as received in Application No. 17 20 2630.
(Continued)

*Primary Examiner* — Brian T Pendleton
*Assistant Examiner* — Frank Johnson
(74) *Attorney, Agent, or Firm* — Maschoff Brennan

(57) ABSTRACT

A handheld device for the image-based measurement of a remote object, comprising a housing having a front side and a rear side, a first and second camera, which are arranged having a stereo base on the rear side, for recording images of the object, an analysis unit having an algorithm for the stereophotogrammetric analysis of the images of the cameras and a display unit, which is arranged on the front side, for displaying images of the object and results of the stereophotogrammetric analysis, wherein the housing has a longitudinal axis, the stereo base is aligned diagonally relative to the longitudinal axis, and the analysis unit is designed for the purpose of taking into consideration the relative alignment of the stereo base during the stereophotogrammetric analysis.

2 Claims, 9 Drawing Sheets

(51) Int. Cl.
*B64D 47/08* (2006.01)
*G01C 11/16* (2006.01)
*G06V 10/75* (2022.01)
*G06T 7/593* (2017.01)
*H04N 13/296* (2018.01)
*G01C 3/14* (2006.01)
*H04N 5/232* (2006.01)
*G06F 3/04842* (2022.01)
*H04N 13/00* (2018.01)

(52) U.S. Cl.
CPC ...... *G06F 3/04842* (2013.01); *H04N 5/23222* (2013.01); *H04N 2013/0074* (2013.01); *H04N 2213/001* (2013.01)

(56) References Cited

U.S. PATENT DOCUMENTS

| | | | | |
|---|---|---|---|---|
| 9,303,982 | B1 * | 4/2016 | Ivanchenko | G01B 11/02 |
| 9,470,792 | B2 | 10/2016 | Giger | |
| 9,609,305 | B1 * | 3/2017 | Ramaswamy | H04N 13/254 |
| 9,886,759 | B2 * | 2/2018 | Lin | G01B 11/2522 |
| 2008/0118143 | A1 * | 5/2008 | Gordon | G01B 11/2513 |
| | | | | 382/154 |
| 2008/0137940 | A1 * | 6/2008 | Kakinami | G06T 7/593 |
| | | | | 382/154 |
| 2008/0239135 | A1 * | 10/2008 | Tamura | H04N 13/289 |
| | | | | 348/335 |
| 2009/0237491 | A1 * | 9/2009 | Saito | G01C 11/06 |
| | | | | 348/47 |
| 2010/0074532 | A1 * | 3/2010 | Gordon | G01B 11/25 |
| | | | | 382/203 |
| 2010/0194860 | A1 * | 8/2010 | Mentz | H04M 1/0264 |
| | | | | 348/47 |
| 2012/0274626 | A1 * | 11/2012 | Hsieh | G06T 5/50 |
| | | | | 345/419 |
| 2012/0293633 | A1 * | 11/2012 | Yamato | G01C 11/06 |
| | | | | 348/47 |
| 2013/0258066 | A1 * | 10/2013 | Asano | H04N 13/296 |
| | | | | 348/47 |
| 2014/0043436 | A1 * | 2/2014 | Bell | G06T 19/20 |
| | | | | 348/46 |
| 2014/0210950 | A1 * | 7/2014 | Atanassov | G06T 7/12 |
| | | | | 348/47 |
| 2014/0363048 | A1 * | 12/2014 | Vrcelj | G06K 9/6228 |
| | | | | 382/103 |
| 2015/0009119 | A1 * | 1/2015 | Zuccarino | G06F 3/0304 |
| | | | | 345/156 |
| 2015/0124060 | A1 * | 5/2015 | Hasegawa | G03B 35/08 |
| | | | | 348/47 |
| 2015/0370348 | A1 * | 12/2015 | Slutsky | G06F 3/0418 |
| | | | | 382/154 |
| 2016/0037152 | A1 * | 2/2016 | Kim | G06T 7/593 |
| | | | | 348/47 |
| 2016/0050401 | A1 * | 2/2016 | Gordon | G01C 3/02 |
| | | | | 348/744 |
| 2016/0234477 | A1 * | 8/2016 | Singhal | H04N 13/239 |
| 2017/0026634 | A1 * | 1/2017 | Mirlay | H04N 13/289 |
| 2017/0264880 | A1 * | 9/2017 | Zolotov | G06K 9/6267 |
| 2018/0144458 | A1 * | 5/2018 | Xu | G06T 7/73 |
| 2018/0150973 | A1 * | 5/2018 | Tang | G06T 7/85 |
| 2018/0156608 | A1 * | 6/2018 | McLean | G01B 11/2518 |
| 2018/0247416 | A1 * | 8/2018 | Ruda | G06T 7/0004 |
| 2019/0139297 | A1 * | 5/2019 | Chen | G06T 15/04 |
| 2019/0236796 | A1 * | 8/2019 | Blasco Claret | G06T 7/557 |

OTHER PUBLICATIONS

Banz et al., "Real-time stereo vision system using semi-global matching disparity estimation: Architecture and FPGA-implementation", Embedded Computer Systems (Samos), 2010 International Conference on, IEEE, Piscataway, NJ, USA, Jul. 19, 2010, pp. 93-101.

* cited by examiner

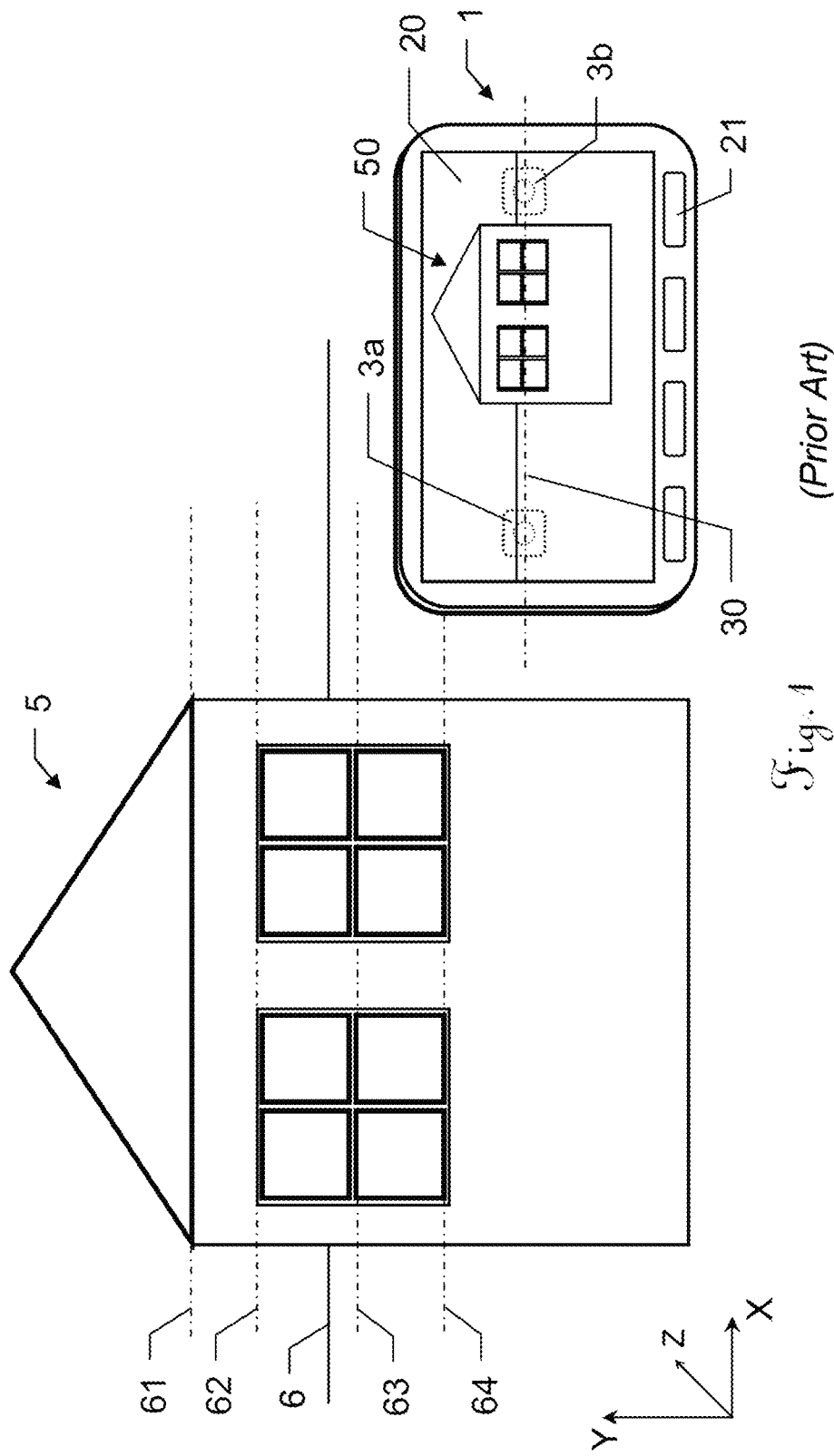

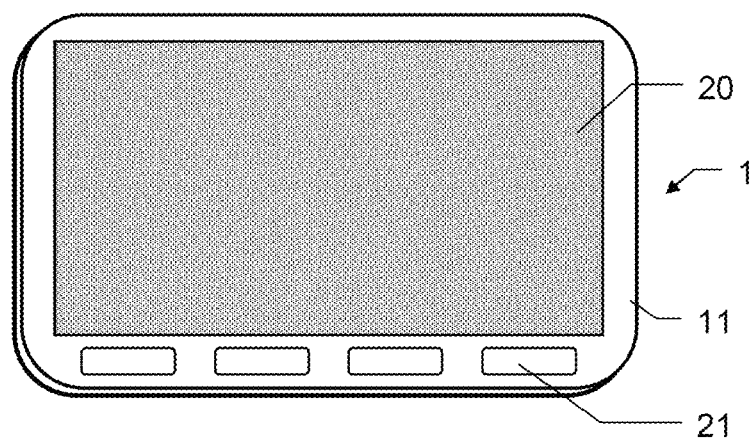
$\mathcal{Fig. 2a}$
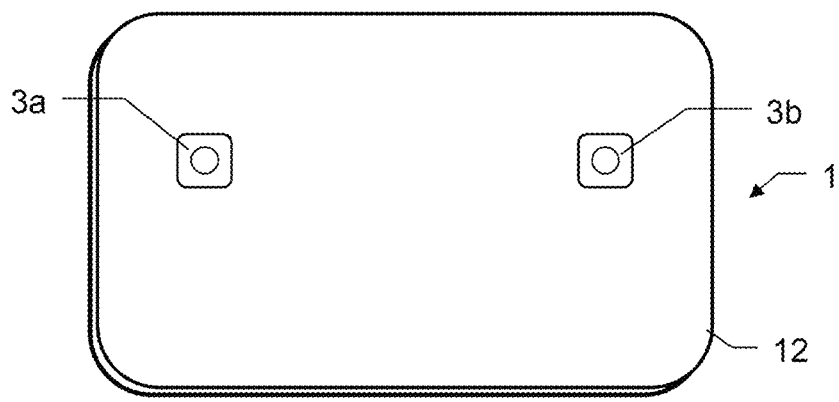
$\mathcal{Fig. 2b}$
(Prior Art)

*(Prior Art)*

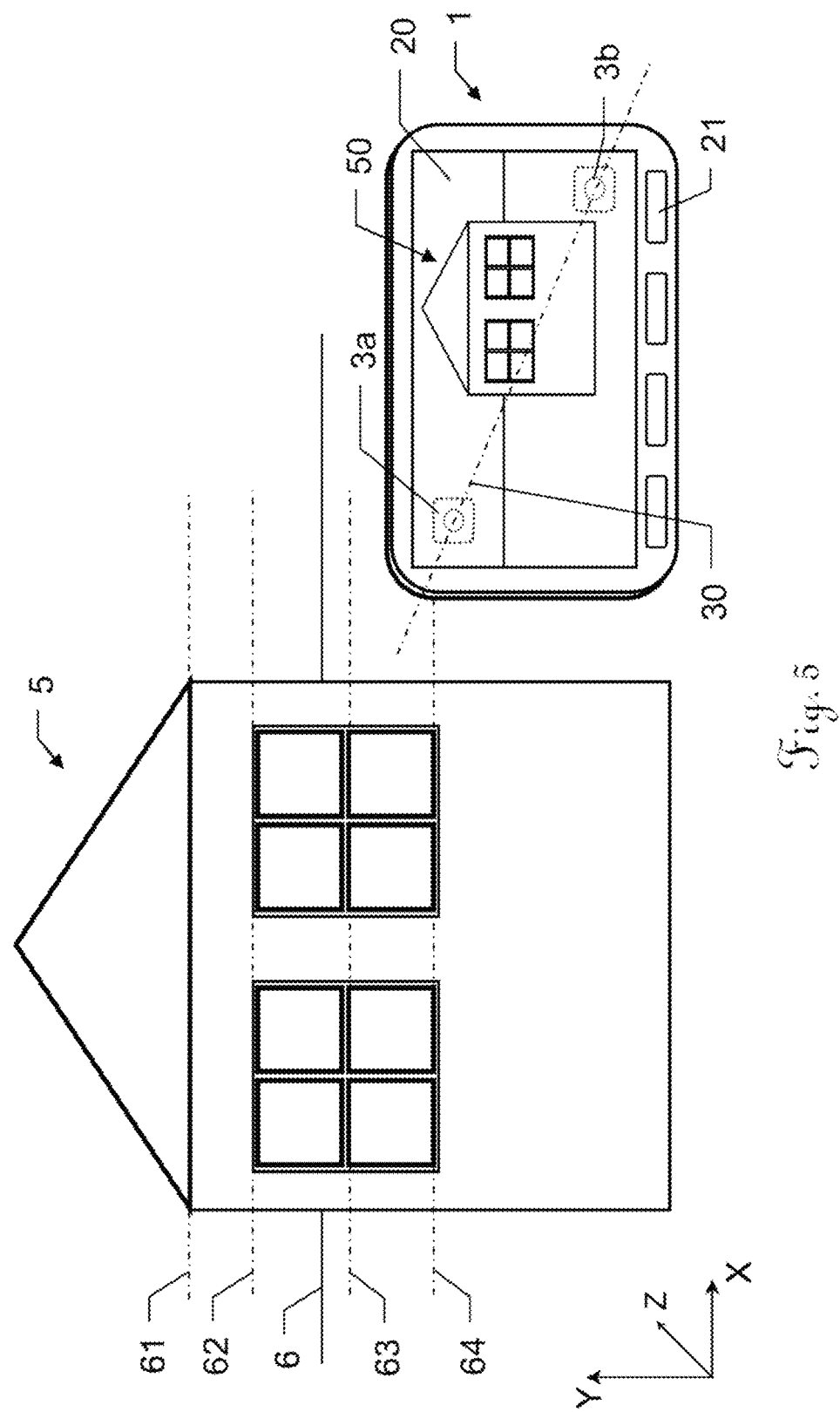

STEREO CAMERA AND STEREOPHOTOGRAMMETRIC METHOD

CROSS-REFERENCE TO RELATED APPLICATIONS

This application claims priority to European Patent Application No. 17202630.4 filed on Nov. 20, 2017, which is incorporated herein by reference.

FIELD OF THE INVENTION

The present invention relates to a handheld device comprising a stereo camera and also a method for image-based measurement of a remote object by means of such a device.

BACKGROUND

Devices and methods for stereophotogrammetric image recording are fundamentally known in the prior art and are used in manifold ways to perform measurements in images, i.e., in particular to ascertain dimensions in an image, for example, distances between depicted features.

For example, EP 2 918 972 A2 discloses a method and a corresponding handheld device for producing a spatial model by means of stereophotogrammetry.

If known stereophotogrammetry devices are used to record images of artificial and/or man-made structures such as buildings, errors can occur during the automated matching of the images by means of feature extraction. This is because in particular modern buildings have many uniform and repeating features. If the stereo base of the stereophotogrammetry device is coincidentally parallel to the repetition direction during the recording, the equivalent features in the two images can be incorrectly associated with one another under certain circumstances, and therefore an incorrectly compiled stereo image results and the image measurements performed therein are flawed.

SUMMARY

It is therefore an object of some embodiments of the present invention to provide a device and a method, by means of which the probability of error during the compilation of the images in the scope of the stereophotogrammetry can be reduced.

In particular, it is an object of some embodiments to provide such a device and such a method, by means of which the probability of error is reducible without special design expenditure or substantially elevated computing power.

A further object of some embodiments is to provide such a device and such a method which can be handled simply and intuitively by a user.

At least one of these objects is achieved by the implementation of the characterizing features of the independent claims. Advantageous embodiments of the invention are found in this case in the respective dependent claims.

Since in particular contemporary buildings are generally planned and built linearly and having right angles, they are aligned to the direction of gravity and the horizon line orthogonal thereto. This has the result that in buildings, the directions of the repetition of identical features (for example, the windows of a window façade) are generally exactly horizontal and/or vertical. In a stereo camera device according to the present invention, a stereo base is therefore used according to the invention which is arranged diagonally in relation to a longitudinal axis of the device, which is aligned substantially horizontally during normal use.

A first aspect of some embodiments of the present invention relate to a handheld device for the image-based measurement of a remote object, comprising a housing having a front side and a rear side, a first camera and a second camera, which are arranged with a stereo base as a fixed spacing in relation to one another on the rear side, for recording images of the object, an analysis unit comprising an algorithm for the stereophotogrammetric analysis of the images of the first camera and the second camera and a display unit, which is arranged on the front side, for displaying images of the object and of results of the stereophotogrammetric analysis. The housing has a longitudinal axis, and the stereo base is aligned diagonally in relation to the longitudinal axis, wherein the analysis unit is designed for the purpose of taking into consideration the relative alignment of the stereo base during the stereophotogrammetric analysis.

According to one embodiment, the device comprises an electronic distance meter, designed in particular as a laser distance meter, which is arranged on the rear side, for measuring a distance to the remote object, wherein the analysis unit is designed for the purpose of taking the measured distance into consideration during the stereophotogrammetric analysis.

According to a further embodiment of the device, the stereo base is arranged at an angle of at least 20°, in particular at an angle between 30° and 60° in relation to the longitudinal axis.

According to a further embodiment, the device is designed for handheld use by a user such that the device is held to record images of the object in such a way that the longitudinal axis is substantially horizontal.

According to one embodiment, the cameras are arranged in such a way that the stereo base comprises at least 75% of a maximum extension of the rear side, in particular at least 90%.

In one embodiment, the device has input means, which are arranged on the front side, for the input of data and/or commands by a user. The input means can be embodied in particular as buttons, or the display unit and the input means are designed as a touchscreen.

The input means are designed in particular for the purpose of enabling marking or selecting of pixels in the image of the object by a user, wherein the pixels correspond to target points of the object. The analysis unit can be designed for the purpose of ascertaining a distance between the target points corresponding to the selected pixels and displaying it on the display unit.

In one embodiment, the device has a recording functionality which runs automatically after triggering by a user, in the scope of which in chronological correlation, in particular simultaneously, the first camera records a first image and the second camera records a second image of the object, the algorithm of the analysis unit relates the first image and the second image to one another by means of feature recognition and on the basis of the knowledge about the stereo base, and an image of the object is displayed on the display unit.

In this case, the relating of the first image and the second image to one another can in particular include a rectification of the images and a stereo matching of the rectified images, in particular by means of the semi-global matching method.

According to a further embodiment, the analysis unit is designed for the purpose of recognizing repeating patterns in at least one of the images and deriving a repetition direction of repeating features of the object therefrom, and ascertaining an angle β between the repetition direction and an epipolar line.

A second aspect of some embodiments of the present invention relate to a handheld device for the image-based surveying of a remote object, comprising a housing having a front side and a rear side, a first camera and a second camera, which are arranged with a stereo base as a fixed spacing in relation to one another on the rear side, for recording images of the object, an analysis unit having an algorithm for the stereophotogrammetric analysis of the images of the first camera and the second camera, and a display unit, which is arranged on the front side, for displaying images of the object and results of the stereophotogrammetric analysis. According to this aspect of the invention, the analysis unit is designed for the purpose of recognizing repeating patterns in at least one of the images and deriving a repetition direction of repeating features of the object therefrom, and of ascertaining an angle β between the repetition direction and an epipolar line, wherein the analysis unit is designed for the purpose of initiating measures if the value of the angle β falls below a predefined threshold value, wherein the measures are capable of resulting in a further recording of images of the object, in which the predefined threshold value is reached or exceeded.

According to one embodiment of the device, the measures comprise a handling instruction for a user, to hold the device inclined for the further recording in comparison to a prior recording, in particular wherein the handling instruction is displayed on the display unit.

A third aspect of some embodiments of the invention relate to a method for the image-based surveying of a remote object by means of a handheld device, in particular a device according to the first or second aspect of the invention, comprising a stereoscopic recording of images by a first camera and a second camera, and a stereophotogrammetric analysis of the images of the first camera and the second camera. The analysis of the images takes place according to this aspect of the invention in consideration of a known angle α, wherein the first camera and the second camera are arranged having a stereo base as a fixed spacing in relation to one another on the device such that the stereo base is aligned diagonally at the angle α in relation to a longitudinal axis of the device.

According to one embodiment, the method comprises
a display of an image on a display unit of the device, based on at least one of the images of the first camera and the second camera,
a selection of dimensions to be measured by a user,
a measurement corresponding to the selection based on the stereophotogrammetrically analyzed images, and
an output of the result on a display unit and/or a storage of the result in a data storage unit of the device.

A fourth aspect of some embodiments of the invention relate to a computer program product having program code which is stored on a machine-readable carrier, for executing a method for the image-based measurement of a remote object by means of a handheld device, in particular a method according to the third aspect, wherein the program is executed in an analysis unit of a device according to the first or second aspect of the invention and comprises at least the following steps:
a stereoscopic recording of images by the first camera and the second camera, and
a stereophotogrammetric analysis of the images of the first camera and the second camera, wherein the analysis takes place in consideration of a known angle α, wherein the first camera and the second camera are arranged having a stereo base as a fixed spacing in relation to one another on the device such that the stereo base is aligned diagonally at the angle α in relation to a longitudinal axis of the device.

A fifth aspect of some embodiments of the present invention relate to a system for the image-based measurement of a remote object, comprising a handheld device and a computer program product. The handheld device comprises in this case a housing having a front side and a rear side, a first and a second camera, which are arranged having a stereo base as a fixed spacing in relation to one another on the rear side, for recording images of the object, and a data interface for transmitting digital image data of recorded images to an external electronic device. The computer program product has program code which is stored on a machine-readable carrier, having an algorithm for the stereophotogrammetric analysis of the images of the first camera and the second camera. The housing has a longitudinal axis and the stereo base is aligned diagonally in relation to the longitudinal axis, wherein the program code contains an item of information about the relative alignment of the stereo base, is executable in the external electronic device, and is designed for the purpose of taking into consideration the relative alignment of the stereo base during the stereophotogrammetric analysis.

According to one embodiment, the handheld device comprises the machine-readable carrier, in particular wherein the machine-readable carrier is a permanently installed data storage unit and is designed for the purpose of transmitting the program code via the data interface to the external electronic device.

BRIEF DESCRIPTION OF THE DRAWINGS

The device according to the invention and the method according to the invention will be described in greater detail solely by way of example hereafter on the basis of specific exemplary embodiments schematically illustrated in the drawings, wherein further advantages of the invention will also be discussed. In the specific figures:

FIG. 1 shows a recording of an image of a building by means of a handheld stereophotogrammetry device of the prior art;

FIGS. 2a-b show the stereophotogrammetry device from FIG. 1;

FIG. 5 shows a recording of an image of a building by means of an exemplary embodiment of a handheld stereophotogrammetry device according to the invention;

FIG. 10 shows an exemplary embodiment of a system according to the invention for the image-based measurement of a remote object.

DETAILED DESCRIPTION

Figure 3A:
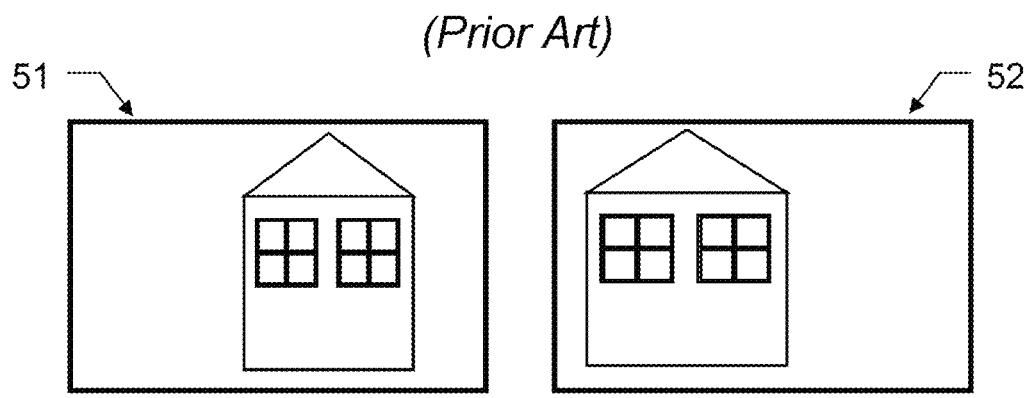
FIGS. 3a-c show problems during the photogrammetric measurement of the building using the device from FIG. 1.

A recording of an image 50 of a building 5 by means of a handheld stereophotogrammetry device 1 of the prior art is illustrated in FIG. 1. A front side 11 of the device facing toward a user during the recording is shown. This front side has a display unit 20, for example, embodied as a touchscreen, and a panel having buttons 21 for selecting functions of the device 1.

Two cameras 3a, 3b are arranged having a stereo base 30 on a rear side of the device 1 facing toward the building 5 to be recorded. The stereo base 30 is parallel to a longitudinal axis of the device 1 here.

The building 5 as the object to be recorded by the cameras 3a, 3b, which is shown here in front of a horizon 6 for illustration, has an array of prominent features which are aligned horizontally, i.e., along the X axis. This relates, for example, to the windows and the eaves, which are aligned along the horizontal lines 61-64. Moreover, predominantly right angles are used, and therefore the features of windows and walls also extend vertically.

The stereophotogrammetry device 1 is designed such that it is preferably held linearly by a user, i.e., having its longitudinal axis parallel to the horizon 6, inter alia, because measured values displayed on the display unit 20 are thus most easily readable. This has the result that the stereo base 30 extends in the same direction as the prominent features of the building 5.

The stereophotogrammetry device 1 from FIG. 1 is shown in detail in FIGS. 2a and 2b. In this case, FIG. 2a shows the front side 11 having display unit 20 and buttons 21, and FIG. 2b shows the rear side 12 having the two cameras 3a, 3b, which are arranged at the same height of the housing.

Figure 3B:
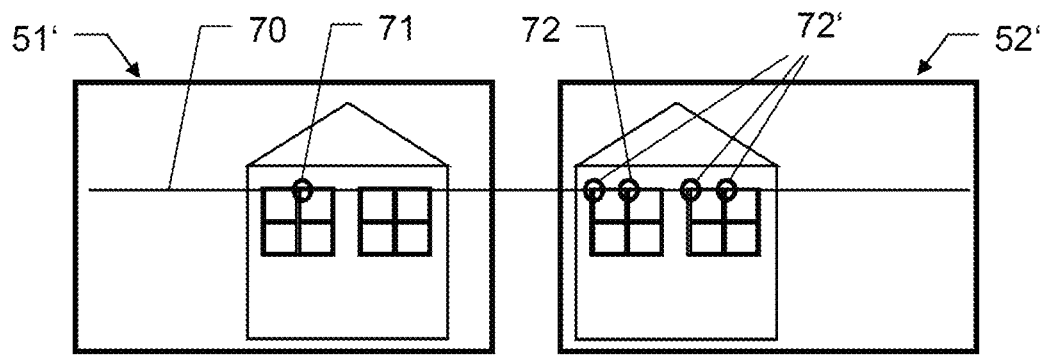
Figure 3C:
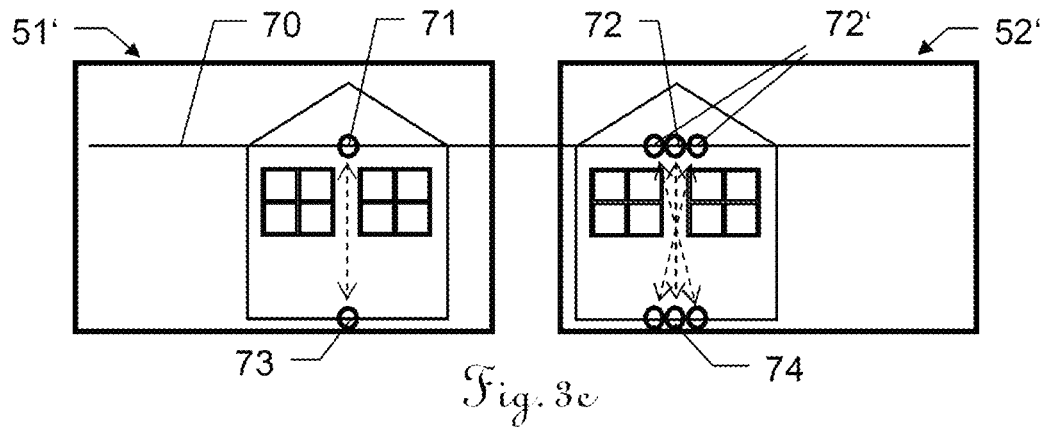

FIGS. 3a-c illustrate which problems occur in the case of the recording of a building 5 shown in FIG. 1 by means of a device 1 shown in FIGS. 2a-b.

FIG. 3a shows adjacent to one another the images 51, 52 of the building simultaneously recorded by the two cameras 3a, 3b. In typical algorithms for stereo matching, for example, "semi-global matching", it is necessary as a previous step for the images to be rectified in relation to one another.

In FIG. 3b, a corresponding rectification of the images from FIG. 3a has taken place. An epipolar line 70 is shown in the rectified images 51', 52', which intersects each of them in a straight line. After the rectification, the epipolar lines 70 in the rectified images 51', 52' are horizontal, i.e., a pixel in the second image 52' corresponding to a pixel located in the first image 51' is located on the same image line. A pixel 72 in the second image 52' corresponding to a point 71 provided in the first image 51' and located on the epipolar line 70 shown can accordingly also only lie on the epipolar line 70.

To match the two images 51, 52, the algorithm thus has to compare a feature in the first rectified image 51' only with those features of the second rectified image 52' which are located on the same epipolar line 70. A corner of a window cross is shown as a feature 71 by way of example here in the left image 51'. Due to the uniform construction, uniform features repeat on the building in the horizontal direction—both windows are of equal size and the same design and moreover are located at the same height.

Since the epipolar line 70 also extends horizontally in the rectified images 51', 52', multiple similar or uniform features 72, 72' are located adjacent to one another on the epipolar line 70 in the right image 52'. Errors can thus occur during matching of the features, if the algorithm erroneously associates an uniform feature 72' with the feature 71 in the first image 51, instead of the actually corresponding feature 72 in the second image 52.

FIG. 3c shows rectified images 51', 52', in which a distance measurement is to take place between two points. In the left image 51', these are the points 73 and 71, which are each located on a horizontally extending line of the building. Errors can also occur here due to the parallelism of the two epipolar lines 70, 70' and the building features, because of which an incorrect distance measurement is performed.

Figure 4A:
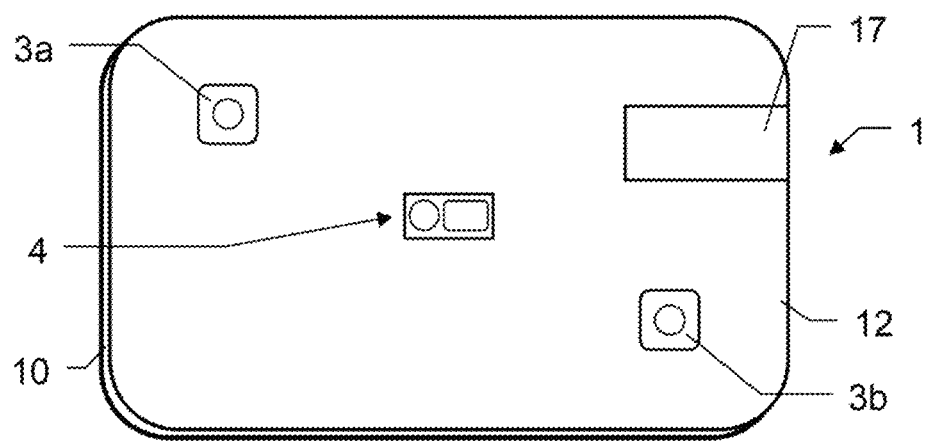
FIGS. 4a-b show an exemplary embodiment of a handheld stereophotogrammetry device according to the invention.
Figure 4B:
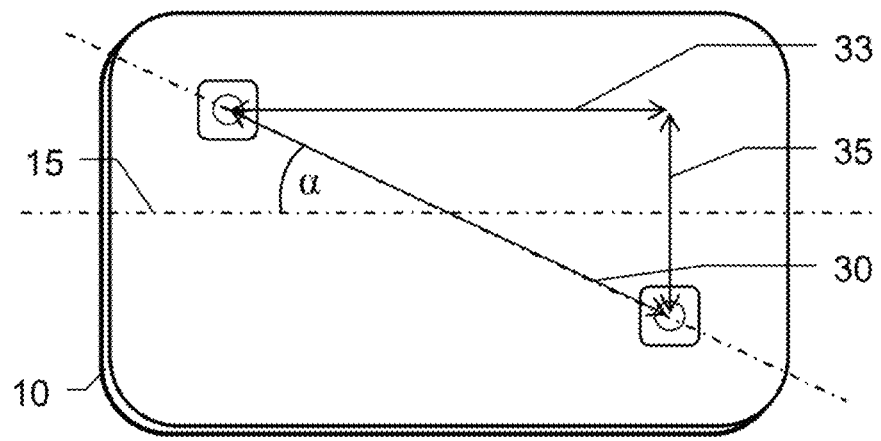

An exemplary embodiment of a stereophotogrammetry device 1 according to the invention is shown in FIGS. 4a and 4b. In this case, the rear side 12 of the housing 10 of the device 1 having the cameras 3a, 3b is shown in each case. A laser distance meter 4 for measuring distances to a remote object (for example, to a point on a building) and a stop unit 17 for stopping the device 1 on a fixed surface are additionally shown in FIG. 4a.

A distance registered using the laser distance meter 4 can be used in particular for scaling the images recorded by the cameras 3a, 3b, which enhances the accuracy of photogrammetric measurements.

FIG. 4b illustrates the geometry. A housing longitudinal axis 15, a housing transverse axis 16 extending orthogonally thereto, and the stereo base 30 aligned diagonally in relation to these two are shown. In addition to a longitudinal spacing 33, which extends along and/or parallel in relation to the longitudinal axis 15, the two cameras are also arranged having a transverse spacing 35 to one another, which extends orthogonally in relation to the longitudinal axis 15. An angle α thus results between the stereo base 30 and the housing longitudinal axis 15 as a function of longitudinal spacing 33 and transverse spacing 35.

Using the device 1 shown, even an untrained user can carry out high-quality photogrammetric measurements on buildings and other man-made structures. In this case, there is generally no necessity of holding the device 1 diagonally during the image recording. Furthermore, a maximum length of the stereo base 30 can advantageously be achieved due to the inclined arrangement of the cameras 3a, b.

However, the device does have to be held diagonally in the case in which natural or artificial objects are to be measured, in the case of which object features repeat at an angle corresponding to the inclination of the stereo base 30. However, such cases occur comparatively rarely in practice.

FIG. 5 shows, similarly to FIG. 1, a recording of an image 50 of a building 5 by means of the handheld stereophotogrammetry device 1 of FIGS. 4a and 4b. In contrast to the device 1 shown in FIG. 1, the stereo base 30 is not aligned parallel in relation to the horizontal lines 61-64, along which the prominent features of the building 5 are aligned, although the device 1 is held linearly.

The user can record stereoscopic images of the building 5 using the cameras 3a, 3b, and can mark pixels 56, 57 in an image 50 displayed by the display unit 20, which correspond to target points 66, 67 on the actual building 5, and can determine a distance 68 between the target points by photogrammetry and have it displayed.

Figure 6A:
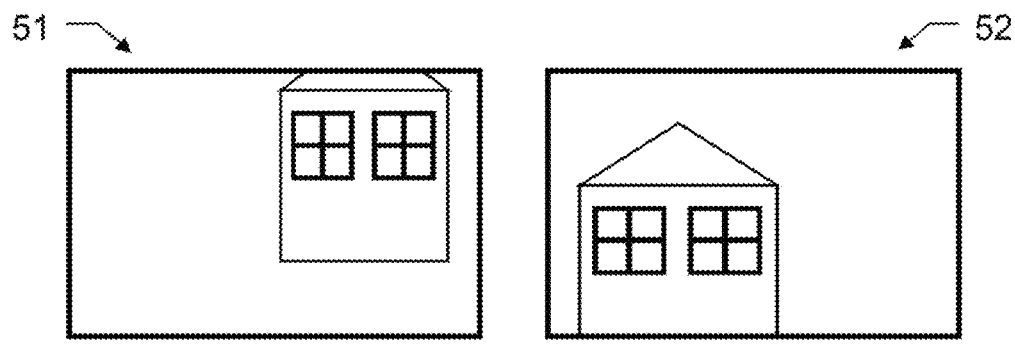
FIGS. 6a-c show a photogrammetric measurement of the building using a device according to the invention.
Figure 6B:
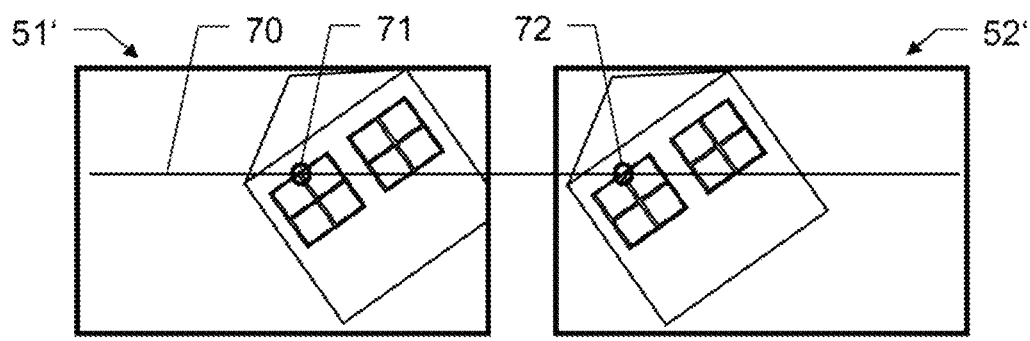
Figure 6C:
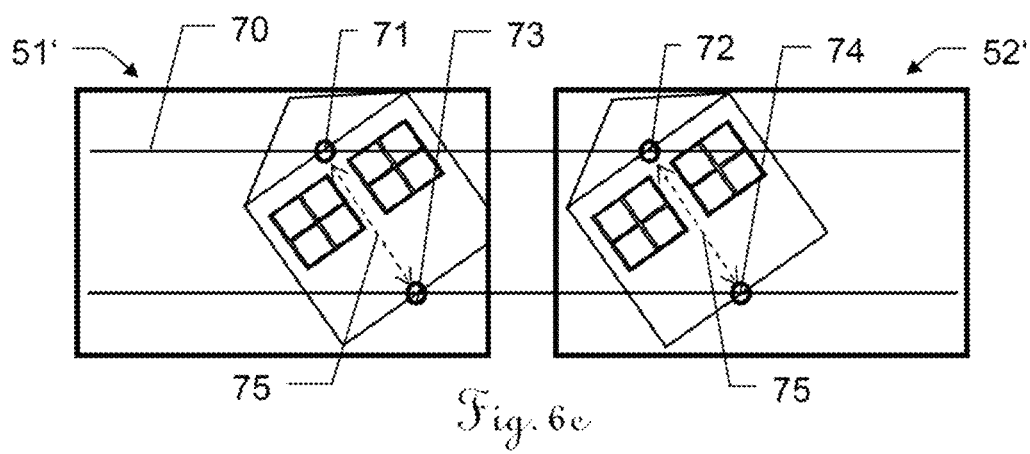

FIGS. 6a-c illustrate how the problems shown in FIGS. 3a-c can be avoided by means of a device according to the invention.

FIG. 6a shows, adjacent to one another, the images 51, 52 of the building recorded simultaneously by the two cameras 3a, 3b of the device from FIG. 5. In typical algorithms for stereo matching, for example, "semi-global matching", it is necessary as a previous step for the images to be rectified in relation to one another.

In FIG. 6*b*, a corresponding rectification of the images from FIG. 6*a* has taken place. An epipolar line 70 is shown in the rectified images 51', 52', which intersects each of them in a straight line. After the rectification, the epipolar lines 70 are horizontal in the rectified images 51', 52', i.e., a pixel in the second image 52' corresponding to a pixel located in the first image 51' is located on the same image line. A pixel 72 in the second image 52' corresponding to a point 71 provided in the first image 51' and located on the illustrated epipolar line 70 can accordingly also only be located on the epipolar line 70.

To match the two images 51, 52, the algorithm thus has to compare a feature in the first rectified image 51' only with those features of the second rectified image 52' which are located on the same epipolar line 70. A corner of a window cross is shown as a feature 71 by way of example here in the left image 51'. Due to the uniform construction, uniform features repeat on the building in the horizontal direction—both windows are of equal size and the same design and moreover are located at the same height.

Because of the diagonal arrangement of the cameras, these naturally horizontal lines extend diagonally in the rectified images. Thus, in contrast to FIG. 3*b*, in the right image 52' multiple similar or uniform features are not located adjacent to one another on the epipolar line 70, but rather only the feature 72 corresponding to the feature 71 in the first image 51. Errors during the association are thus avoided.

FIG. 6*c* shows rectified images 51', 52', in which a distance measurement of the route 75 between two points is to be performed. In the left image 51', these are the points 73 and 71, which are each located on a horizontally extending line of the building. As a result of the diagonal arrangement of the cameras, these naturally horizontal lines extend diagonally in the rectified images. Therefore, the points 72, 74 in the right image 52' can be uniquely associated with the points 71, 73 in the left image 51', whereby the distance of the route 75 can also be ascertained without error.

Alternatively, a matching can also be carried out without prior rectification, of course. In the case of the conventional device from FIG. 1, the (nominally) horizontal epipolar line 70 then crosses multiple identical-appearing horizontally arranged features 72 and 72'. Using the device according to the invention from FIG. 5, in contrast, the epipolar line advantageously only crosses feature 72.

Alternatively, only specific points of interest can also be related to one another, without the entire image having to be processed. For example, a template matching can be executed after a selection of points of interest by the user.

Figure 7:
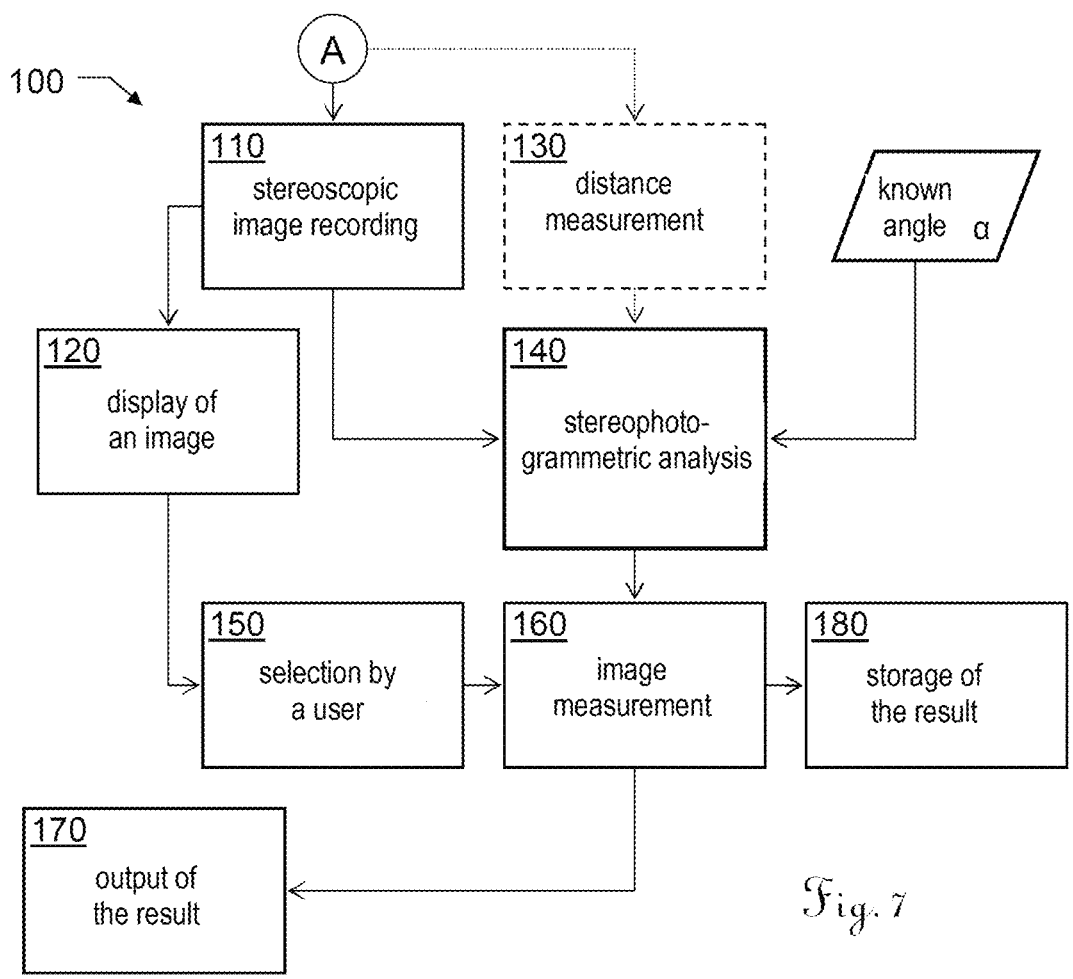
FIG. 7 shows an exemplary embodiment of a method according to the invention for the image-based measurement of a remote object.

FIG. 7 illustrates an exemplary embodiment of a method 100 according to the invention for the image-based measurement of a remote object by means of a handheld device according to the invention.

In step 110, firstly a stereoscopic recording of images of the object is executed by means of the two cameras. Optionally, a distance measurement 130 to the object can be carried out simultaneously, in order to be able to scale the images accurately, and thus have an accurate scale for measurements in the image.

Using the knowledge about the angle α (i.e., about the relative alignment of the stereo base in relation to the longitudinal axis of the device, see FIG. 4*b*), and optionally the distance measurement, a stereophotogrammetric analysis of the stereoscopically recorded images takes place in step 140.

At the same time, an image of the object is displayed to a user on the display unit of the device in step 120, this can be, for example, one of the images of the cameras, or a compiled image already. The user thereupon selects, in step 150, certain routes or areas on the basis of the image, the dimensions of which are to be measured. These dimensions are determined in step 160 by means of image measurement in the stereophotogrammetrically analyzed images and finally displayed to the user on the display unit in step 170 and stored in a storage unit of the device in step 180.

In one embodiment, the analysis unit of the device is designed for the purpose of recognizing repeating patterns in the images and deriving a repetition direction of repeating real features therefrom. This is shown in FIGS. 8*a* and 8*b*.

Figure 8A:
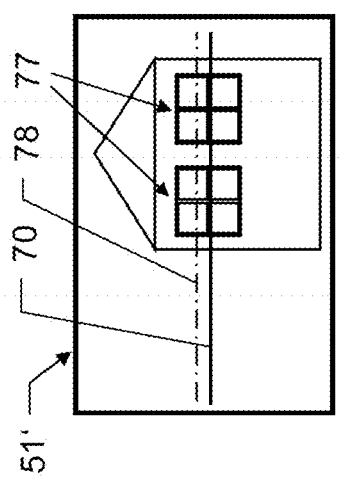
FIGS. 8a-b show a recognition of an angle between an epipolar line and a repetition direction of features.

FIG. 8*a* shows, by way of example, a rectified image 51' of the object as recorded by the device in FIG. 1. The algorithm of the analysis unit recognizes the windows of the building as repeating features 77 and derives a repetition direction 78 of these features therefrom.

Subsequently, it is established that the repetition direction 78 is parallel to the epipolar line 70, which can result in errors during the matching of the images, as shown in FIG. 3*b*. In this case, the analysis unit initiates measures to end this parallelism. Inter alia, these measures can include an instruction to the user to make a new recording, wherein the device is held differently, in particular tilted in relation to the last recording. This instruction can preferably be carried out on the display unit, in addition, an acoustic signal or a vibration can also be triggered.

Figure 8B:
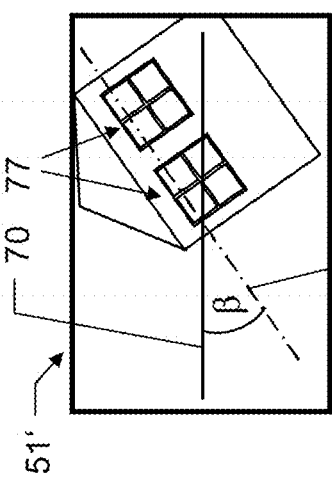
Figure 40:
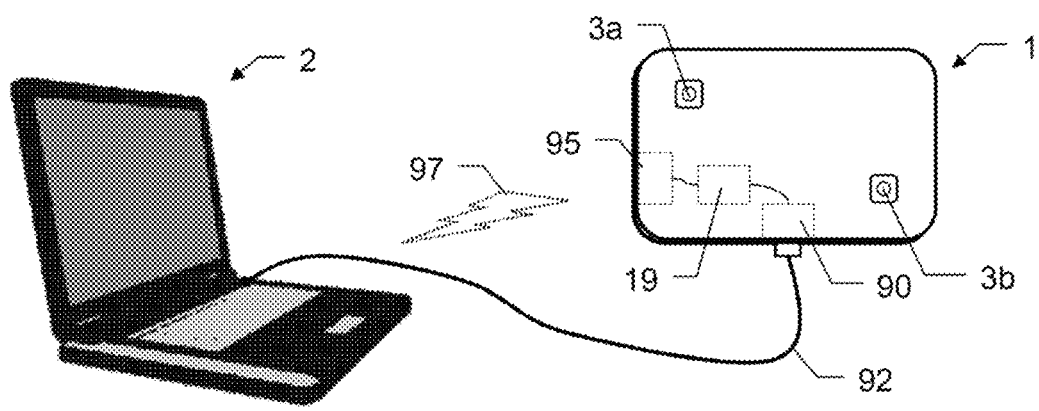

FIG. 8*b* shows, by way of example, a rectified image 51' in which the angle β, between the repetition direction 78 of the features 77 and the epipolar line 70 is large enough. This can be in particular the result of a changed attitude of the device in relation to that from FIG. 8*a*—or the result of a recording using the device from FIG. 5.

The analysis unit is preferably designed for the purpose of ascertaining the angle β, between the repetition direction 78 and the epipolar line 70 and initiating the measures if the value of the angle β, falls below a predefined threshold value.

Figure 9:
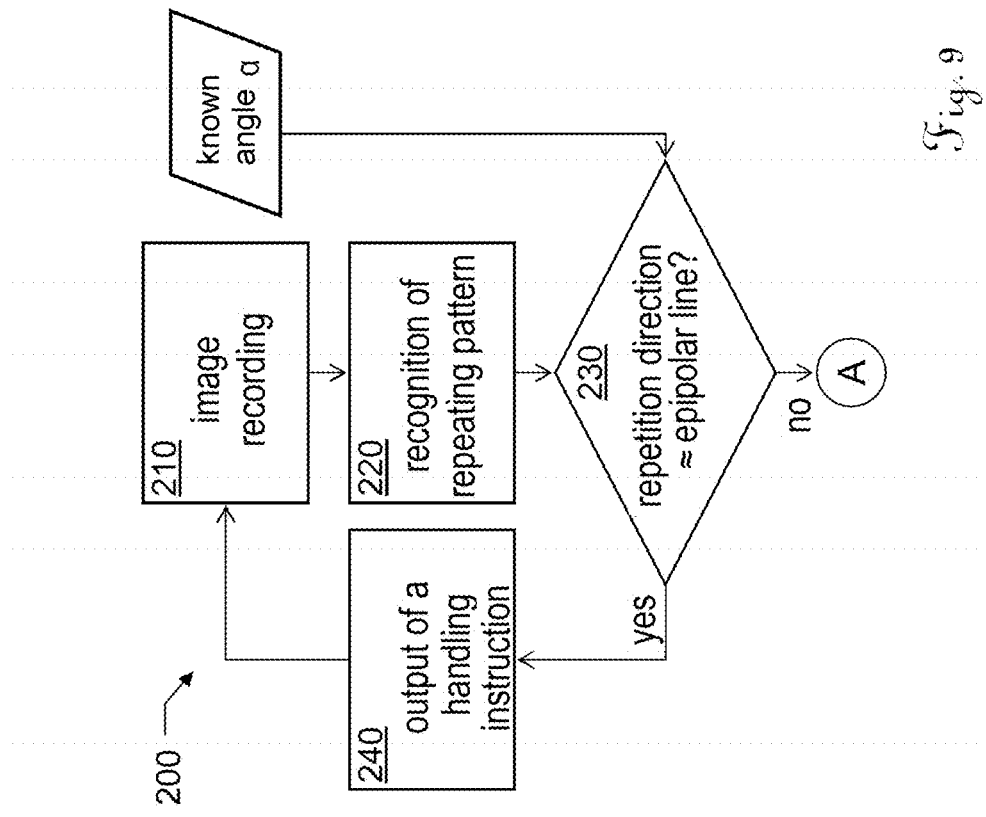
FIG. 9 shows method steps for recognizing an angle between an epipolar line and a repetition direction.

FIG. 9 illustrates further steps as a part 200 of the method 100 from FIG. 7, which relate to the comparison of epipolar line and repetition direction shown in FIGS. 8*a*, *b*.

In particular, this method part 200 can be placed before that shown in FIG. 7. It begins in step 210 with an image recording by one or both cameras of the device, wherein at least one image of the object to be measured is recorded. In the image, repeating object features are recognized as repeating patterns (step 220) and compared to an epipolar line (step 230). The known angle α of the stereo base can be used for this purpose. If repetition direction and epipolar line are excessively similar, i.e., if a value of the angle β, is below an established threshold value, a handling instruction is output to the user, to hold the device differently (step 240). Otherwise, the method shown in FIG. 7 can be executed.

FIG. 10 shows a further exemplary embodiment of a handheld stereophotogrammetry device 1 according to the invention. It has at least one interface 90, 95 for connection to an external electronic device, for example, a laptop computer 2. A plug interface 90 for establishing a wired connection 92 (for example, by means of USB) and a wireless interface 95 for establishing a wireless connection 97 (for example, by means of WLAN or Bluetooth) are shown here by way of example. Image data of the images recorded by the cameras 3*a*, 3*b* are transmitted to the laptop 2 via the (wired or wireless) connection 92, 97, where they are analyzed stereophotogrammetrically. The system has corresponding software, which also provides items of information about the arrangement of the two cameras 3*a*, 3*b*, and is installed for this purpose on the laptop 2. The software is preferably stored in a storage unit 19 of the device and is transmitted via the (wired or wireless) connection 92, 97 to the laptop 2. It can also be provided on a data carrier or in the Cloud. The advantage of this embodiment is that the handheld device 1 does not have to have a separate analysis unit; a display unit is also not necessary. The resulting device 1 can thus be more compact and lighter and can be produced with less technical expenditure.

The stereophotogrammetry device 1 is used by the user to record images, the data of which are transferred—either in real time or following a recording series—to the laptop 2. The software is stored in the storage unit 19 and is transmitted to the laptop 2 together with the image data, for example. In particular, steps 140-170 of the method 100 from FIG. 7 can be executable on this laptop.

It is apparent that these illustrated figures only schematically show possible exemplary embodiments. The various approaches can also be combined with one another and with methods and devices of the prior art.

What is claimed is:

1. A handheld device for the image-based measurement of a remote object, comprising:
   a housing having a front side and a rear side and a longitudinal axis;
   a first camera and a second camera, which are arranged having a stereo base as a fixed spacing in relation to one another on the rear side, for recording images of the object;
   an analysis unit having an algorithm for the stereophotogrammetric analysis of the images of the first camera and the second camera; and
   a display unit, which is arranged on the front side, for displaying images of the object and results of the stereophotogrammetric analysis,
   wherein the analysis unit is designed for:
   recognizing repeating patterns in at least one of the images and deriving a repetition direction of repeating object features of the object therefrom,
   ascertaining an angle P between the repetition direction and an epipolar line, and
   initiating measures if the value of the angle β falls below a predefined threshold value, wherein the measures are capable of resulting in a further recording of images of the object, in which the predefined threshold value is reached or exceeded,
   wherein the handheld device is designed for handheld use by a user in such a way that the device is held to record images of the object in such a way that the longitudinal axis is substantially horizontal.

2. The device according to claim 1, wherein the measures comprise a handling instruction for a user to hold the device diagonally for the further recording in comparison to a prior recording.

* * * * *